R. H. WATKINS.
SPRING SUSPENSION FOR VEHICLES.
APPLICATION FILED JUNE 6, 1921.
1,418,758.
Patented June 6, 1922.
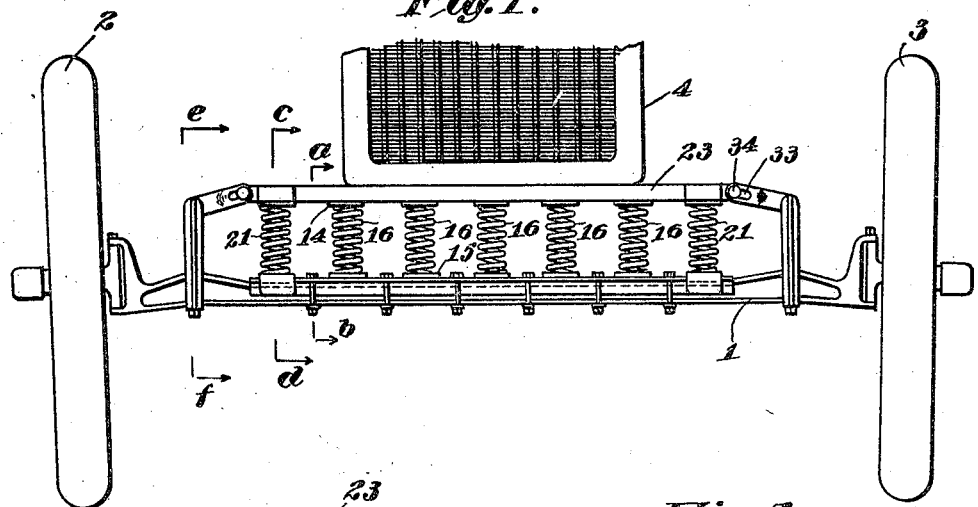
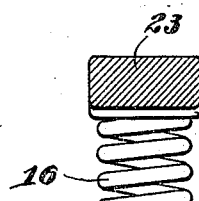
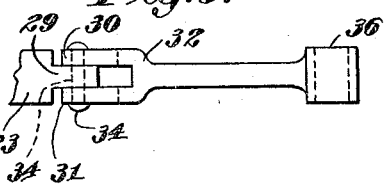
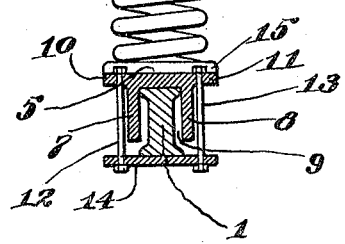
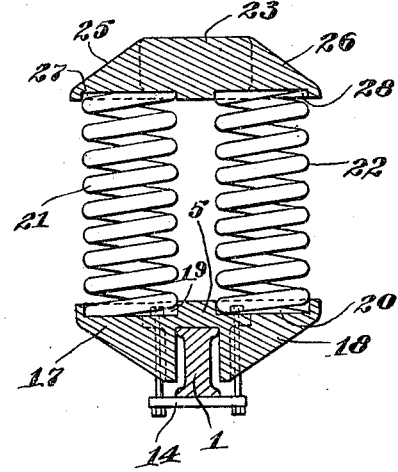
Inventor
Raymond H. Watkins,
by Roberts, Roberts, & Cushman
Attorneys

UNITED STATES PATENT OFFICE.

RAYMOND H. WATKINS, OF SOMERVILLE, MASSACHUSETTS.

SPRING SUSPENSION FOR VEHICLES.

1,418,758.  Specification of Letters Patent.  Patented June 6, 1922.

Application filed June 6, 1921. Serial No. 475,199.

*To all whom it may concern:*

Be it known that I, RAYMOND H. WATKINS, citizen of the United States of America, and resident of Somerville, in the county of Middlesex and State of Massachusetts, have invented new and useful Improvements in Spring Suspensions for Vehicles, of which the following is a specification.

This invention relates to motor vehicles and more particularly to spring suspension means for use thereon.

In accordance with the usual practice, suspension means of the leaf-spring type are employed between the axles and bodies of motor vehicles, but when such springs are used, it is, in most cases, found essential to comfort and ease in riding, to provide in addition thereto some form of shock absorbing means. While shock absorbing devices of many kinds and of a very efficient character may be obtained, it is obviously desirable for various reasons to dispense, if possible, with the necessity for their use.

The principal object of the present invention is to provide an improved suspension device, readily applicable to vehicles of usual types without substantial change therein, and which shall at the same time in large measure render additional shock absorbing means unnecessary.

One mode of attaining the desired object is illustrated in the accompanying drawings in which:—

Fig. 1 is a fragmentary front elevation of a vehicle of ordinary construction showing the device of the present invention as applied thereto;

Fig. 2 is a vertical cross section on a line such as *a—b* of Fig. 1;

Fig. 3 is a vertical cross section on the line *c—d* of Fig. 1;

Fig. 4 is a vertical cross section on the line *e—f* of Fig. 1; and

Fig. 5 is a fragmentary plan view illustrating a link connection employed in the device.

In Fig. 1 there is shown at 1 the front axle of a motor vehicle of well-known type, such axle comprising an I-bar which at its opposite ends supports the wheels 2, 3, respectively. At 4 is indicated the forward part of the vehicle body. Resting upon the upper surface of the axle 1 is a supporting bar or beam 5, such beam preferably being of channel form having the spaced downwardly directed flanges 7, 8, providing between them a channel 9 for the reception of the axle 1. In accordance with a preferred arrangement, the opposite sides of the bar 5 are provided with longitudinal flanges 10, 11, such flanges having a series of openings therethrough. Passing through such openings are bolts such as 12, 13, the lower ends of which pass through openings in a plate member 14. By tightening the nuts upon the ends of the bolts, the plate member 14 may be caused to engage the lower surface of the axle 1, thus securely clamping the support 5 thereto.

The upper surface of the member 5 is provided with a series of annular bosses 15 spaced longitudinally of its central portion, such bosses providing cup-like depressions or sockets for the reception of the lower ends of coiled springs 16. While it is preferred to form the sockets for the spring 16 in bosses upstanding from the surface of the member 5, it is evident that the sockets might be formed directly in the thickness of said member 5 without employing bosses upstanding therefrom. Adjacent its opposite ends the supporting member 5 is provided with offset portions 17, 18, respectively, such offset portions having sockets 19, 20, respectively in their upper surfaces. The sockets 19, 20 serve for the reception of coiled springs 21, 22, spaced apart in a direction transverse of the member 5.

The vehicle body 4 rests upon a bar or beam 23 which may be secured to such vehicle body in any usual and desirable manner. This member 23 is of elongated form and extends substantially parallel to the member 5 and in the vertical plane of the axle 1. The lower surface of the member 23 is furnished with a series of annular bosses 24 providing socket openings for the reception of the upper ends of the respective springs 16. At its opposite ends the member 23 is also provided with offset portions 25, 26, in the under surface of which are formed cavities 27, 28 for the reception of the upper ends of the respective springs 21.

In accordance with a preferred arrangement, the end portions of the bar 23 are reduced in thickness to provide the tongues 29 which are received between the spaced arms 30, 31 of link members such as 32, respectively. The arms 30, 31 of the link members are longitudinally slotted as indicated at 33, and passing through the slots 33 and through suitable openings in the tongues 29 are bolts or pins 34, such pins serving to pivotally connect the respective links to the ends of the bar 23 while permitting a limited amount of relative longitudinal movement of such parts. At their outer ends the links 32 are furnished with enlarged heads 35 provided with transverse openings 36 therethrough.

Secured to either end of the axle 1 at points intermediate the wheels 2, 3, and the adjacent ends of the supporting member 5 are brackets such as 37. These brackets are preferably formed with spaced upper and lower arms 38, 39, which engage the upper and lower surfaces of the axle 1 respectively. Passing through openings in the arms 38, 39 are bolts such as 40 for securing the brackets to the axle. Such bolts may, if desired, enter the usual openings provided for attaching the leaf springs commonly employed in vehicles of this character, such springs being removed prior to the application of the present device. The brackets 37 are preferably bowed in a forward direction as indicated at 41 in order to avoid interference with the usual steering gear. The brackets at their upper portions provide overhanging members 42 in which are secured the pivot pins or bolts 43, such bolts or pins engaging within the openings 36 in the link members 32 and serving to pivotally support such link members. For retaining the link members in operative position on the pins 43, the latter may be screw threaded at their outer extremities for the reception of nuts 44.

The device as thus described may be applied to a vehicle axle of ordinary construction, the usual springs having first been removed therefrom. The member 5 is set down over the axle and clamped thereto by means of the bolts 13 and the plate 14. The body 4 is secured to the bar 23 and the interposed springs 16, 21, 22 serve resiliently to support the bar 23 and the body 4 upon the axle. These springs being of coiled form are somewhat more sluggish in their action than springs of the leaf type and thus are not as responsive to sudden shocks due to inequalities in the road bed as are leaf springs. These springs thus act to a certain degree as shock absorbers while at the same time providing the necessary resiliency to furnish the desired easy-riding qualities for the vehicle. By the provision of the brackets 37 with their rigidly supported pivot pins 43, any forward or rearward movement of the bar 23 in a direction transverse of the axle is prevented. The arrangement of the springs 21, 22 is such as to take care of any slight oscillation of the bar 23 about the longitudinal axis of the axle 1, while the pin and slot connections of the links 32 with the bar 23 serve to permit the free movement of the latter bar in a vertical plane as permitted by the springs 16.

The device as thus provided may be substituted for the usual springs of a motor vehicle, furnishing at the same time shock absorbing means of a very simple and inexpensive character, and while herein illustrated as applied to a front axle, might be found useful for application to fixed rear axles when such are employed. It is also evident that if one or more of the springs 16, or 21 become broken in use, they may readily be replaced without loss of time, such springs being of relatively small size and such as may be carried in the tool box if desired.

Having thus described the invention in a preferred embodiment of the same together with the mode of application thereof, what I claim and desire to secure by Letters Patent of the United States is:

1. A suspension apparatus for vehicles comprising an elongated support, means for detachably securing said support to the vehicle axle to extend longitudinally thereof, a body supporting bar arranged substantially parallel to said support, coil springs interposed between said support and bar, rigid bracket members fixed relatively to the axle but spaced above the same, and connections between said bracket members and the respective ends of the bar whereby to prevent movement thereof in a direction transverse of the axle while permitting movement thereof in the vertical plane of the axle.

2. A spring suspension for vehicles comprising a member arranged to extend longitudinally of the vehicle axle and substantially in the vertical plane of the latter, resilient means interposed between said member and axle, a bracket secured to the axle, said bracket having a rearwardly directed arm spaced vertically from the axle, and connections between said bracket arm and member so constructed and arranged as to prevent movement of the latter in a direction transverse of its length.

3. A spring suspension device for vehicles comprising a body supporting member arranged substantially in the vertical plane of the vehicle axle, resilient means interposed between said member and axle, a pair of link members having pivotal connection with the respective ends of said member, bracket members fixedly secured to the axle but spaced above the same, a journal pin carried by each of said bracket members and extending in a direction transverse of the axle, said links having openings for the reception of the respective pins.

4. A device of the class described comprising a body-supporting bar resiliently supported upon the vehicle axle and extending substantially parallel thereto, a bracket member detachably secured to the axle and extending upwardly therefrom, a pivot pin secured to the bracket and extending transversely of the axle and above the same a link member having one of its ends pivoted upon said pin, said link having a longitudinal slot adjacent its opposite end, and a pin secured in said bar and engaging said slot.

5. An apparatus of the class described comprising a pair of parallelly arranged elongate bars, each of said bars having a plurality of spring positioning elements spaced longitudinally thereof, offset members extending laterally in opposite directions from each of said bars and adjacent each end thereof, said offset members having spring positioning elements, and coil springs interposed between said bars and having their ends engaging oppositely disposed positioning elements of the respective bars, a journal pin extending transversely of one of said members and adjacent to the end thereof, means carried by the other of said members for supporting said pin, a link journaled on said pin and a pin-and-slot connection between said link and said first named member.

Signed by me at Boston, Massachusetts, this twenty-first day of May, 1921.

RAYMOND H. WATKINS.